J. McISAAC.
REELING MACHINE.
APPLICATION FILED AUG. 25, 1914.

1,179,016.

Patented Apr. 11, 1916.
7 SHEETS—SHEET 2.

J. McISAAC.
REELING MACHINE.
APPLICATION FILED AUG. 25, 1914.

1,179,016.

Patented Apr. 11, 1916.
7 SHEETS—SHEET 4.

Fig. 4.

Witnesses
F. L. Gibson.

Inventor
John McIsaac.
By Victor J. Evans
Attorney

J. McISAAC.
REELING MACHINE.
APPLICATION FILED AUG. 25, 1914.

1,179,016.

Patented Apr. 11, 1916.
7 SHEETS—SHEET 6.

Witnesses
F. C. Gibson.

Inventor
John McIsaac.

By Victor J. Evans
Attorney

UNITED STATES PATENT OFFICE.

JOHN McISAAC, OF MARCUS HOOK, PENNSYLVANIA.

REELING-MACHINE.

1,179,016.  Specification of Letters Patent.  Patented Apr. 11, 1916.

Application filed August 25, 1914.  Serial No. 858,539.

*To all whom it may concern:*

Be it known that I, JOHN McISAAC, a citizen of the United States, residing at Marcus Hook, in the county of Delaware and State of Pennsylvania, have invented new and useful Improvements in Reeling-Machines, of which the following is a specification.

This invention is an improved reeling machine for reeling silk and other thread from skeins, bobbins, cops or spools and forming the same into skeins, one object of the invention being to provide an improved machine of this character which greatly reduces the cost of operation and of the skeins of silk, yarn or other material formed by the machine.

Another object of the invention is to provide an improved reeling machine which effects an economy of power and also is so compactly arranged and constructed as to effect an economy of floor space in the factory where it is used.

Another object of the invention is to provide an improved machine of this character which may be readily operated by boys or girls as young as are permitted to work in mills and which is so constructed as to eliminate all danger to the operator even if the operator should get caught in the machine in any way.

Another object is to provide an improved machine of this character which can be started or stopped by the operator at any time between the skein lengths and which is also provided with an improved automatically operating stopping mechanism.

Another object of the invention is to provide an improved reel of this character which enables the operator to take off the skeins without removing the reel head.

Another object of the invention is to effect improvements in the construction of the reel head whereby the same is rendered collapsible to facilitate the removal of the skeins and which after the skein has been taken off readily adjusts itself to working order, allowing the operator freedom to tie up the ends and start the machine again in operation, without moving away.

Another object of the invention is to effect improvements in the automatic stopping mechanism so that the machine can be regulated for reeling skeins, half skeins one and a half skeins and double skeins.

Another object of the invention is to effect improvements in the construction of the machine so that the machine head can be taken off the frame for repairs without having to stop or affect any other part, or any other machines on the same frame.

Another object of the invention is to provide an improved machine of this character in which the traverse rod is caused to operate so as to lay the yarn on the reel head with diamond spaces in the skein, to enable the operator to lace or tie the skein without breaking any of the ends.

Another object of the invention is to provide an improved machine of this character which may be adjusted to lay skeins of any desired width.

Another object of the invention is to provide an improved machine of this character which is practically noiseless when in operation.

Another object is to effect improvements in the construction of the reeling machine so that any number of heads may be used on one supporting frame and any number of frames may be joined together and run from a single belt, thereby effecting great economy of shafting and belting.

With the above and other objects in view the invention consists in the construction, combination and arrangement of devices hereinafter described and claimed.

In the accompanying drawings.

Figure 1:
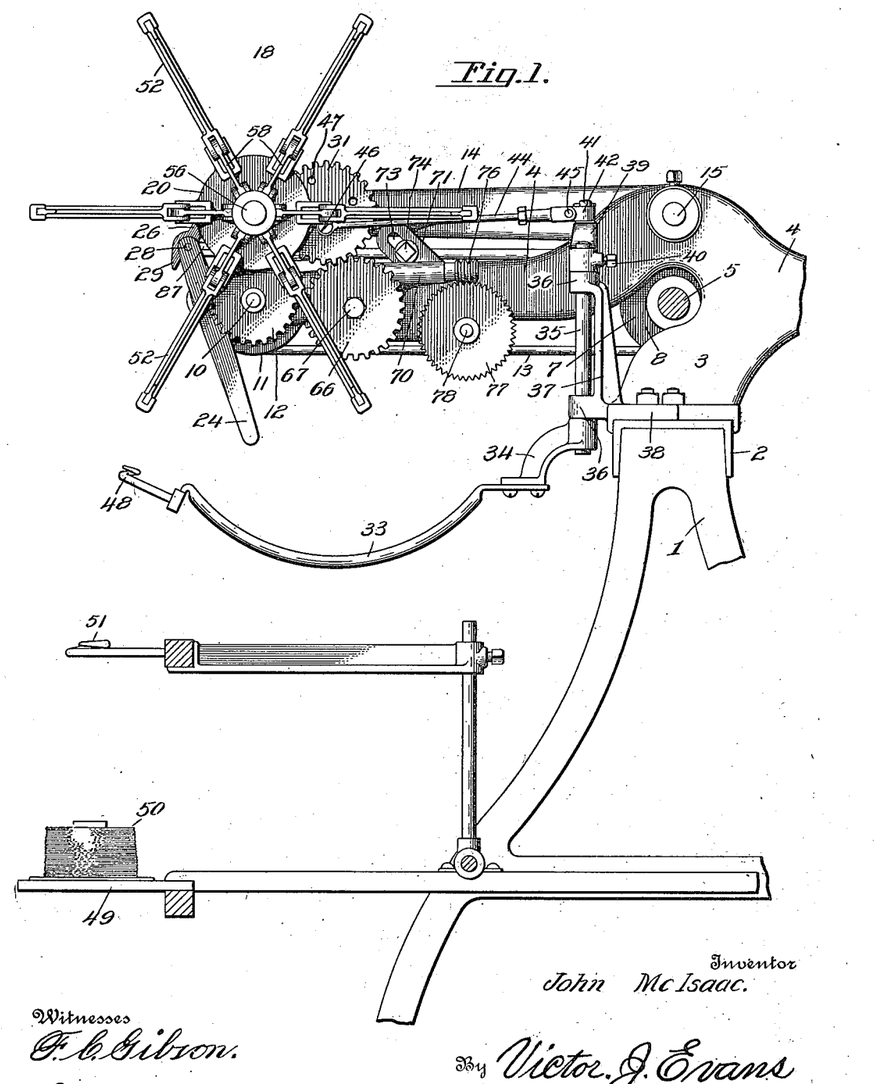
—Figure 1 is an elevation, showing one side of my improved reeling machine, the power shaft being indicated in section.
Figure 2:
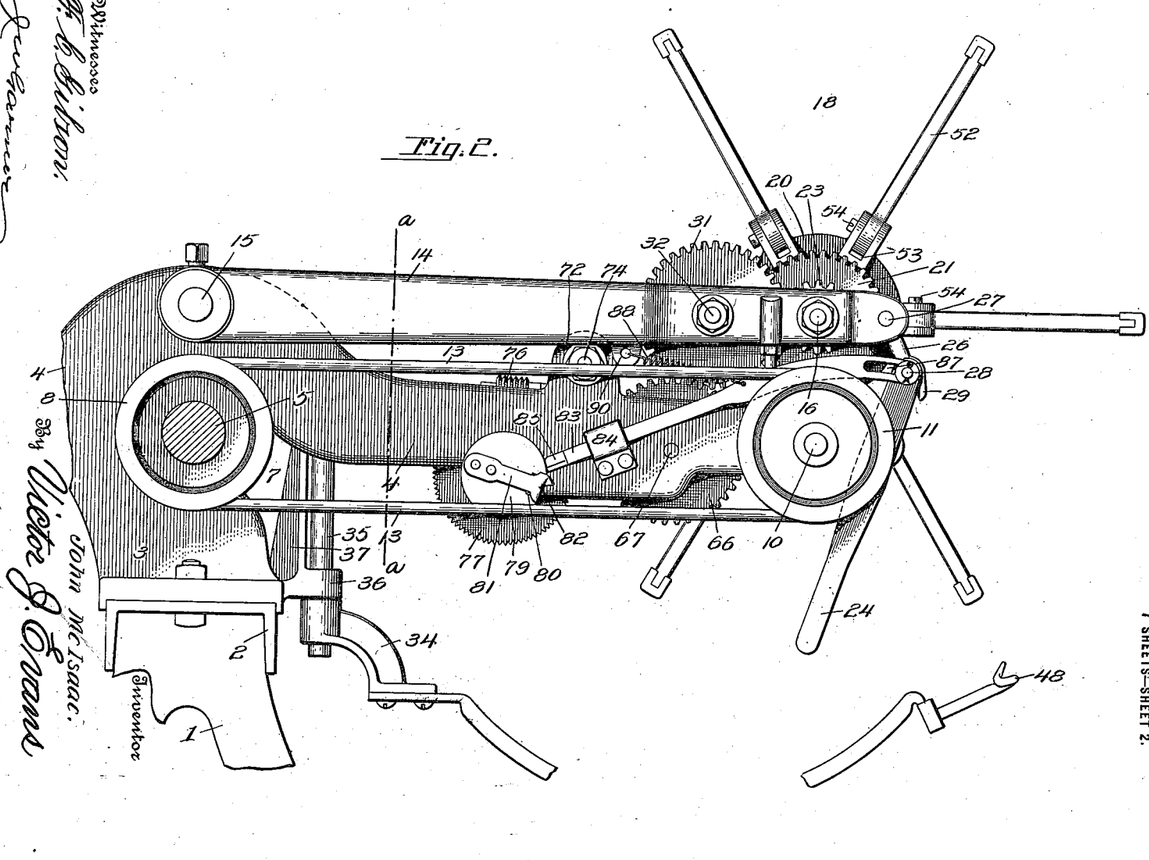
Fig. 2 is a similar view showing the other side of the machine.
Figure 3:
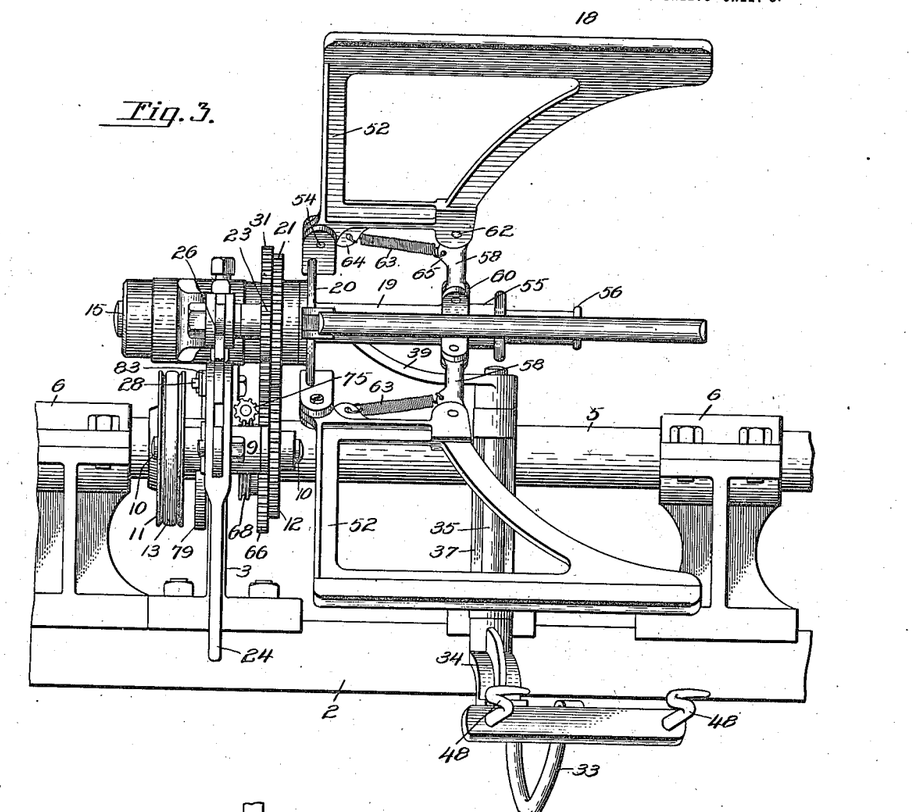
Fig. 3 is a front elevation of the same.
Figure 4:
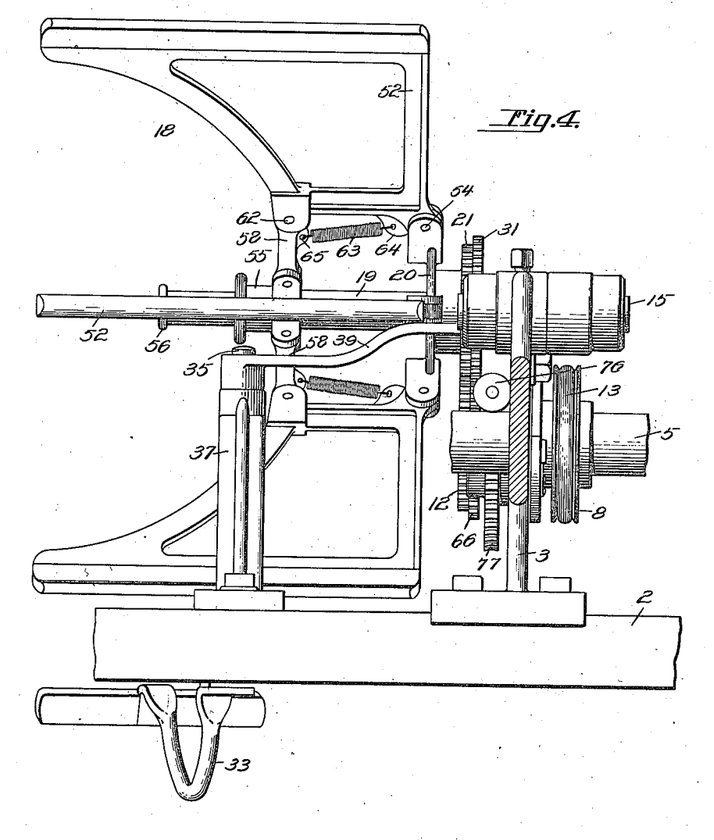
Fig. 4 is a vertical sectional view of the same on the plane indicated by the line *a—a* of Fig. 2.
Figure 5:
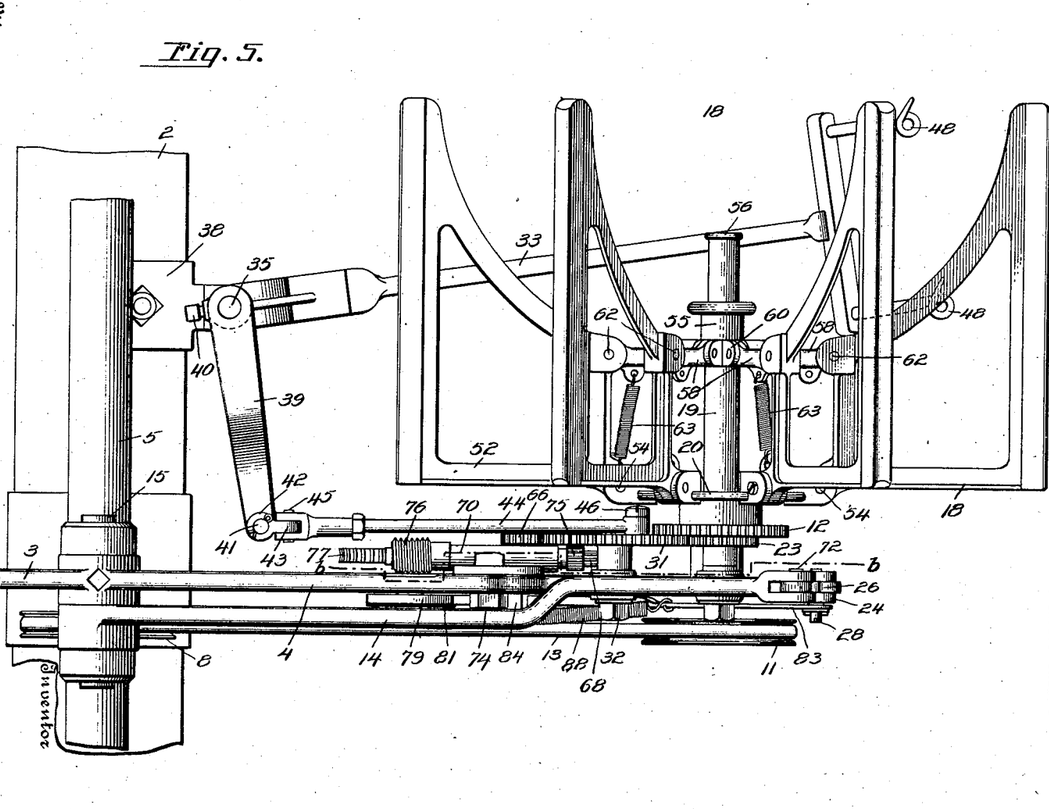
Fig. 5 is a plan view of the same.

The supporting frame 1 may be of the construction here shown or of any other suitable construction and in practice is preferably of considerable length and provided at the top with a longitudinally arranged channel beam 2 on which the heads 3 of the number of reeling machines are arranged and secured for operation and in practice each reel head is provided with a pair of oppositely extending arms 4 and reeling mechanism carried by and operated on said arms. For the purposes of this specification and to enable the drawings to be made on as large a scale as possible one of the arms 4 is shown broken away in Figs. 1—2. The reels on opposite sides of the reel head are identical in construction and hence only one is herein described.

A power shaft 5 is provided for operating on the reels, and this power shaft is entirely disconnected from the heads 3 and has its bearings in supports 6 which are mounted on the beam 2 independently of the head 3 and said head is formed with a recess 7 in one side which clears said shaft and enables the head with its reels to be removed from the beam 2 without affecting the shaft 5 or any of the other reel heads on the frame. This construction is highly advantageous as it greatly facilitates and reduces the cost of repairs and enables repairs on any reel to be effected without throwing any of the other reels out of operation. The shaft 5 is provided with a pulley 8 for each reel.

Near the outer end of the arm 4 is a bearing 9 for a shaft 10. Said shaft has a pulley 11 at one end and a spur gear 12 at the opposite end. Said pulley is connected to the pulley 8 by an endless belt 13 and this belt while tight enough on the pulleys to drive the reel will slip on the pulley 11 in the event that the operator gets caught in any part of the machine and hence the reel will stop and injury to the operator will be entirely avoided.

An arm 14 is pivotally mounted at its inner end on the head 3 as at 15 so that the outer end of said arm may be raised and lowered. Said arm is provided near its outer end with a shaft 16 which is here shown as having a threaded end and secured to said arm by means of a clamping nut 17. The reel 18 has a tubular shaft 19 which is swivelly mounted on the shaft 16. At the inner end of said tubular shaft is a hub member 20 and on the outer side of said hub member is a gear 21 which is also mounted for rotation on said shaft 16 and is secured to the hub member by screws 22. The gear 21 is for engagement with the gear 12 to drive the reel and is disengaged from said gear 12 to stop the operation of the reel. A gear 23 which is smaller than the gear 21 is on the outer side thereof and is here shown as formed intergrally therewith.

Figure 10:
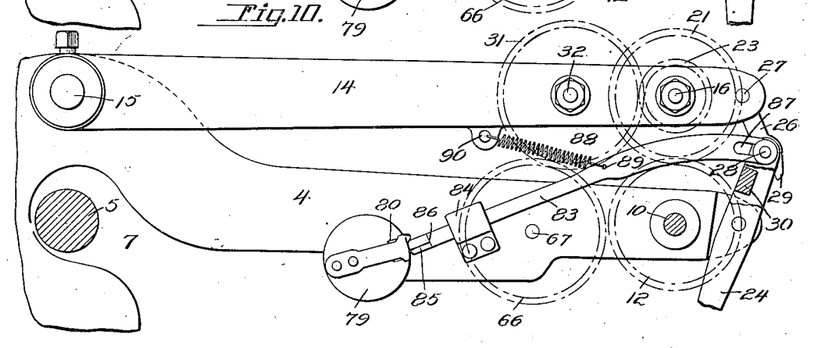
Fig. 10 is a similar view of the same and showing the position of the parts of the stop mechanism when the reel is in operation.
Figures 11, 12:
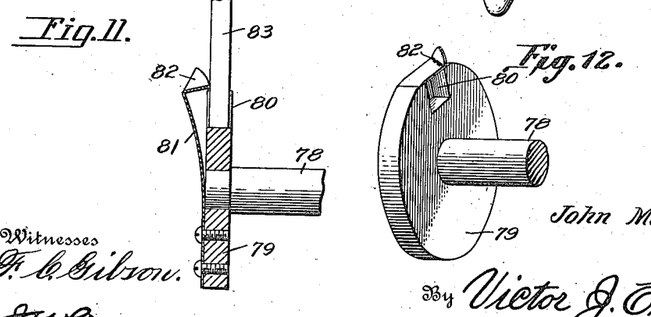
Fig. 11 is a detail sectional view of the stop disk and also showing the stop rod and the fender spring.
Fig. 12 is a detail perspective view of the stop disk and its fender spring.

A stop lever 24 is provided which is pivotally mounted at the outer end of the arm 4 as at 25. This stop lever may be manually operated and may also, as hereinafter more fully described be automatically operated. A link 26 has its upper end pivotally connected to the outer end of the arm 14 as at 27 and is pivotally connected near its lower end to the lever 24 by a pin 28. The lower portion of the link is arranged in a bifurcation in the upper end of the lever 24 and is formed with an arm 29. The lever 24 has a shoulder 30 in its bifurcated upper portion which when said lever is turned to a vertical position, to raise the arm 14 and thereby throw the reel out of gear by disengaging the gear 21 from the reel 12 becomes engaged by said arm 29 and hence the arm 14 is held in such raised position. By turning the lever 24 to an inclined position as shown in Fig. 10 the arm 14 is lowered to engage the gear 21 with the gear 12 and hence start the reel in operation as will be understood.

A gear 31 for operating the traverse arm engages the gear 23 and is mounted on a shaft 32 which is secured to and carried by the arm 14. The traverse arm 33 has its inner end secured to an arm 34 at the lower end of a vertical rock shaft 35. Said rock shaft is mounted in bearings 36 in a standard 37 which has a base 38 that is bolted on the beam 2 independently of the head 3. An arm 39 is secured to the upper end of said shaft 35 by a set screw 40. The arm has a vertical pin 41 at its free end on which the hub member 42 of a link arm 43 is mounted. A pitman 44 has its inner end bifurcated to receive the arm 43 and is pivotally mounted thereon as at 45 so that said pitman is adapted to play vertically and the outer end of the pitman is connected by a crank pin 46 to the gear 31. The said gear has adjusting openings 47 at varying distances from its center for the reception of the crank pin so that the latter may be adjusted as desired to regulate the "throw" or extent of movement of the traverse arm and hence the latter may be regulated to lace skeins of any desired width on the reel. The traverse arm in guiding the yarn on the reel lays the yarn with an open cross wind forming diamond spaces in the skeins, as will be understood, so that the operator can lace or tie the skein without breaking any ends. The traverse arm is provided at its free ends with guides 48 for the yarn. The frame 1 is provided with a suitable support 49 for the spool, bobbin or cop indicated at 50 and the frame also is provided with a thread guide 51 above said support.

Any suitable guides may be provided within the scope of my invention.

The reel 18 is provided with radial arms 52 each of which is pivotally mounted at its inner end on one side in a radial slot 53 of the hub member 20, the pivots for the reel arms being indicated at 54. The sleeve 55 is loosely mounted on the tubular reel shaft 19 for longitudinal movement, said reel shaft having a head 56 at its outer end to form a stop for said sleeve in one direction and being also provided with an annular shoulder 57 to stop the movement of said sleeve in the reverse direction. Said sleeve is connected to the arms 52 of the reel by links 58 each of which has its inner end pivotally mounted in a slot 59 of said sleeve as at 60 and having its outer end pivotally mounted in a slot 61 of the reel arm as at 62. A coiled retractile spring 63 is associated with each reel arm and its link 58 and has its ends connected thereto as at 64—65. These springs exert their tension on the links to normally draw the sleeve inwardly, arrange said links vertically and hence cause the latter to extend the radial arms of the reel. When a skein or skeins have been laid on the reel and it is desired to remove them the operator draws the sleeve 55 outwardly on the tubular shaft thereby causing the links 58 to draw the corresponding ends of the reel arms inwardly, thus collapsing the reel and enabling the skein to be readily taken off. As soon as the skein has been taken off the springs act to draw the sleeve inwardly and radially extend the reel arms 52 thus readjusting the reel to working condition and allowing the operator freedom to tie up the ends and start up the machine without moving away.

I will now describe my improved stop mechanism for automatically controlling the operation of the reel and causing it during each period of operation to make a half skein, a skein, one and a half skeins or two skeins at will.

A gear 66 is mounted on a shaft 67 with which the arm 4 is provided and said gear is adapted to be engaged and disengaged by the gear 31. On the inner side of said gear 66 is a worm 68 which revolves therewith. A shaft 69 is mounted in a bearing 70 which has an arm 71 that bears against the lug 72 with which the arm 4 is provided, and the said arm 71 of the bearing has an adjusting slot 73 through which extends a bolt 74 that adjustably secures said bearing to the lug. The shaft 69 is provided at one end with a gear 75 which engages the worm 68 and is provided at the opposite end with a worm 76 which engages a gear 77. Said gear 77 is mounted on a shaft 78 which revolves in and extends through a bearing opening with which the arm 4 is provided and on the opposite end of said shaft 78 from the gear 77 is a stop disk 79 which revolves with said gear 77.

Figure 6:
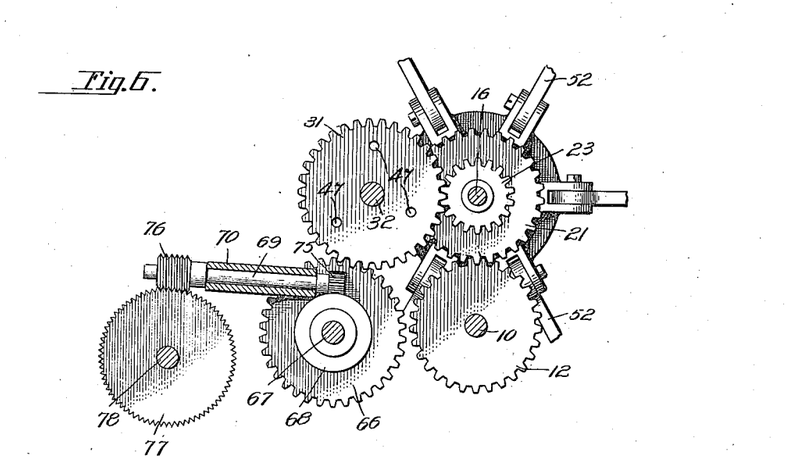
Fig. 6 is a vertical sectional view on the plane indicated by the line *b—b* of Fig. 5.
Figure 7:
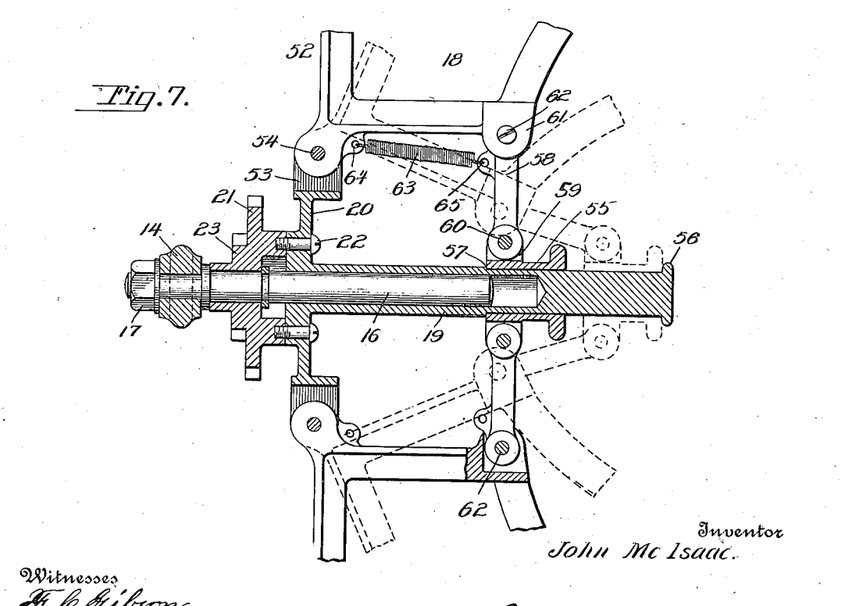
Fig. 7 is a detail sectional view of the reel head.
Figure 8:
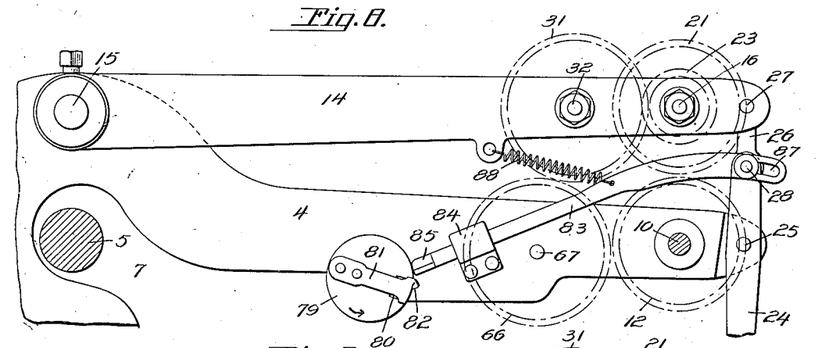
Fig. 8 is a detail elevation, partly in section, and illustrating the operation of the stopping mechanism when manually operated.
Figure 9:
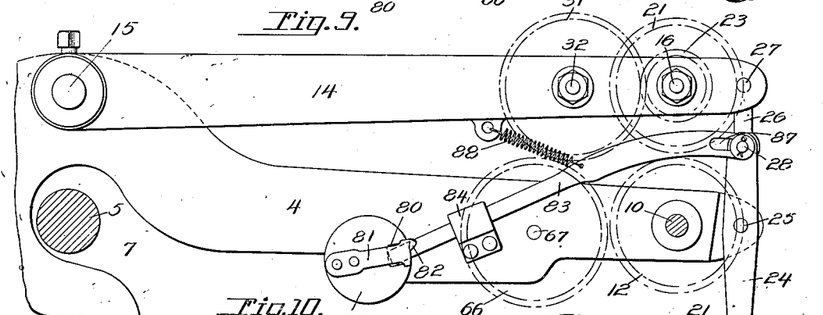
Fig. 9 is a similar view of the same and showing the stopping mechanism in the act of automatically operating to stop the reel.

It will be understood from the foregoing description and by reference to the drawings, especially Fig. 6, that the gear 77, which is the predetermining or stop gear revolves very slowly and makes only one rotation while the reel is making the necessary number of rotations to lay a half skein, a skein, a skein and a half or a double skein as the case may be and for thus predetermining the operation of the reel and arranging for the reel to be automatically stopped after having laid a skein such as desired. A gear 77 of any desired diameter may be employed, several such gears of different diameters, being in practice provided with each machine, any one of which may be used as desired. The adjustable bearing 70 adapts the shaft 69 to be adjusted correspondingly so as to cause the worm 76 to engage the gear 77 regardless of the diameter of the latter.

The stop disk 79 is provided with a radial stop notch 80 in one side and is also provided with a spring fender 81 to normally close over the periphery of said stop disk and at the outer end of the stop notch. This fender has an obliquely arranged cam 82 at its front end. A stop rod 83 is mounted for longitudinal movement in a guide 84 on one side of the arm 4. The inner end of this stop rod is reduced on one side as at 85, adapted to enter the notch in the stop disk and provided with a shoulder 86. The outer portion of the stop rod is curved and is provided with a slot 87. The pin 28 which pivotally connects the link 26 and the stop lever 24 also forms a pivotal connection between said stop lever and the stop rod and said pin passes through and is movable longitudinally in said slot. A spring 88 is employed to actuate the stop rod and cause the latter to move lengthwise and enter the notch 80 of the stop disk at the conclusion of each rotation of each stop disk. This spring is here shown as a coiled retractile spring having one end attached to the stop rod as at 89 and the other end attached to the arm 14 as at 90. The slot 87 permits the lever 24 to be operated manually at any time desired so as to raise the arm 14 and thereby throw the reel out of gear and cause the reel to stop. When the reel has made the required number of revolutions to lay the skein or skeins thereon the notch 80 of the stop disk 79 reaches and registers with the inner end of the stop rod and thereupon the stop rod is caused by the spring 88 to enter said notch and in so doing to turn the lever 24 to the required vertical position to throw the reel out of gear and cause the gear to stop.

During the operation of the reel the stop disk makes one rotation in the direction indicated by the arrow and as the notch of the stop disk nears the end of the stop rod the cam 82 of the fender spring engages the inner end of the rod and causes the fender to be moved outwardly so as to uncover the stop notch and when the stop rod enters the stop notch the fender bears against the outer side of the stop rod. If the lever is then operated to put the reel in gear, and which must be done manually, the stop rod is drawn out of the stop disk notch by the lever and immediately the spring fender closes over said stop notch thus preventing the stop rod from reëntering said notch until after the disk has made another revolution.

Having thus described my invention, I claim:—

1. In a reeling machine, a frame having a longitudinally arranged beam, supports on the beam and having bearings, a power shaft mounted in said bearing above said frame, a reel head secured on the frame, having a recess in one side which clears said shaft and through which said shaft extends, said head being removable from the beam independently of the shaft, a reel mounted on the reel head, pulleys on said shaft and reel-head in the same horizontal plane and a belt connecting said pulleys.

2. A reel head having a fixed arm, a driving gear mounted on said arm, a second arm mounted for movement toward and from the fixed arm, a lever to move the second arm and a reel mounted on and carried by the movable arm and having a gear for engagement with and disengagement from the first named gear, a traverse arm operating gear also carried by the movable arm and engaged with a second gear on the reel, speed reducing mechanism mounted on the fixed arm and including a gear for engagement with and disengagement from the traverse arm operated gear, a stop disk revolved by said speed reducing gear and having a notch, a stop rod connected to said lever to operate the latter, and adapt it to enter said stop notch and a spring to actuate said stop rod.

3. In a reel of the class described a stop lever adapted for manual operation, a slidable stop rod having a slot, a pivot connected to the stop lever and arranged in said slot so that the stop rod is pivotally and also slidably connected to said stop lever, a spring to normally operate said stop rod and lever, and a stop disk on the periphery of which the inner end of said stop rod normally bears and said stop disk having a stop notch to receive the said end of said rod, and means to actuate said stop disk.

4. In a reel of the class described a stop lever adapted for manual operation, a stop rod slidably connected to said stop lever, a spring to normally operate said stop rod and lever, and a stop disk on the periphery of which the inner end of said stop rod normally bears, said stop disk having a stop notch to receive the said end of said rod, and means to actuate said stop disk, and a fender on said stop disk to close said notch, said fender having stop rod actuated means to move the fender from the notch and permit the stop rod to enter the notch and to cause said fender to reclose the notch when the stop rod is drawn therefrom.

5. A reel head having a fixed arm, a driving gear mounted on said arm, a second arm pivotally mounted on the reel head for movement toward and from the fixed arm, a manually operable lever fulcrumed to the fixed arm, a link connecting said lever to the second arm, a reel mounted on and carried by the second arm and having a gear for engagement with and disengagement from the first named gear, a traverse arm operating gear also carried by the movable arm and engaged with a second gear on the reel, speed reducing mechanism mounted on the fixed arm and including a gear for engagement with and disengagement from the traverse arm operating gear, a stop disk revolved by the speed reducing gear and having a notch, a stop rod slidably connected to the lever to operate the latter, and adapted to enter said stop notch, and a spring to actuate said stop rod.

6. In combination, a beam, supports on said beam, a driving shaft mounted in bearings in said supports, a reel head on said beam, a traverse arm, a support for the traverse arm, in which the latter is pivotally mounted, said support being connected to the beam, said support and the said reel head being removable from the beam each independently of the other and also independently of the shaft, a reel mounted on the reel head, power connections between the reel head, and the traverse arm.

In testimony whereof I affix my signature in presence of two witnesses.

JOHN McISAAC.

Witnesses:
M. EDITH JOHNSON,
MARY E. JOHNSON.